United States Patent
Camarota

(10) Patent No.: US 10,929,331 B1
(45) Date of Patent: Feb. 23, 2021

(54) LAYERED BOUNDARY INTERCONNECT

(71) Applicant: Xilinx, Inc., San Jose, CA (US)

(72) Inventor: Rafael C. Camarota, San Jose, CA (US)

(73) Assignee: XILINX, INC., San Jose, CA (US)

( * ) Notice: Subject to any disclaimer, the term of this patent is extended or adjusted under 35 U.S.C. 154(b) by 21 days.

(21) Appl. No.: 16/388,474

(22) Filed: Apr. 18, 2019

(51) Int. Cl.
*G06F 13/42* (2006.01)
*G06F 13/20* (2006.01)

(52) U.S. Cl.
CPC ............. *G06F 13/42* (2013.01); *G06F 13/20* (2013.01); *G06F 2213/40* (2013.01)

(58) Field of Classification Search
CPC .................................. G06F 13/42; G06F 13/20
See application file for complete search history.

(56) References Cited

U.S. PATENT DOCUMENTS

| | | | |
|---|---|---|---|
| 7,573,295 B1 * | 8/2009 | Stadler | H03K 19/17732 326/38 |
| 7,701,252 B1 * | 4/2010 | Chow | H01L 25/0657 326/101 |
| 10,528,513 B1 * | 1/2020 | Chan | G06F 13/4068 |
| 2007/0101242 A1 | 5/2007 | Yancey et al. | |
| 2012/0319730 A1 * | 12/2012 | Fitton | G06F 13/385 326/41 |
| 2014/0108628 A1 * | 4/2014 | Ananthiah | H04L 47/10 709/222 |
| 2016/0216330 A1 * | 7/2016 | Lenka | G01R 31/318516 |

* cited by examiner

*Primary Examiner* — Tim T Vo
*Assistant Examiner* — Phong H Dang
(74) *Attorney, Agent, or Firm* — Patterson + Sheridan, LLP

(57) ABSTRACT

Examples described herein generally relate to a layered boundary interconnect in an integrated circuit (IC) and methods for operating such IC. In an example, an IC includes a programmable logic region, a plurality of input/output circuits, a plurality of hard block circuits, and a programmable native transmission network. The programmable native transmission network is connected to and between the plurality of input/output circuits and the plurality of hard block circuits. The plurality of hard block circuits is connected to and between the programmable native transmission network and the programmable logic region.

20 Claims, 10 Drawing Sheets

US 10,929,331 B1

LAYERED BOUNDARY INTERCONNECT

TECHNICAL FIELD

Examples of the present disclosure generally relate to an integrated circuit (IC) and methods of operating such IC, and in particular, relate to a layered boundary interconnect in an IC and methods for operating such IC.

BACKGROUND

A programmable logic device (PLD), such as a field programmable gate array (FPGA), is generally an integrated circuit (IC) that includes programmable logic. The programmable logic can be in a region of the IC, such as a programmable logic region. A programmable logic region of an IC may also be referred to as a fabric within the IC. The programmable logic region can be programmable to be configured to implement various logic functions, applications, or kernels. The logic functions, etc., can be performed on signals received by the programmable logic region from some circuit outside of the programmable logic region, and can generate signals to be communicated from the programmable logic region to some circuit outside of the programmable logic region. In some instances, the architecture of the programmable logic region can create challenges for communicating signals to and from the programmable logic region.

SUMMARY

Examples described herein generally relate to a layered boundary interconnect in an integrated circuit (IC) and methods for operating such IC. In some examples, multiple layers of a boundary interconnect are implemented between periphery interfaces and one or more programmable logic regions in a layout of an IC.

An example of the present disclosure is an IC. The IC includes a programmable logic region, a plurality of input/output circuits, a plurality of hard block circuits, and a programmable native transmission network. The programmable native transmission network is connected to and between the plurality of input/output circuits and the plurality of hard block circuits. The plurality of hard block circuits is connected to and between the programmable native transmission network and the programmable logic region.

Another example of the present disclosure is a method for operating an IC. A protocol routing network of the IC is programmed. The protocol routing network is connected to and between hard block circuits of the IC and a programmable logic region of the IC. The hard block circuits are connected to the programmable logic region. A native transmission network of the IC is programmed. The native transmission network is connected to and between input/output circuits of the IC and the hard block circuits. The programmable logic region is programmed.

Another example of the present disclosure is an IC. The IC includes a layout area, a programmable logic region disposed within the layout area, boundary circuits disposed within the layout area, and a programmable native transmission network. The layout area has edges. The boundary circuits are disposed along the edges. The boundary circuits include input/output circuits. The input/output circuits are disposed in a shadow of another one or more of the boundary circuits orthogonal to the input/output circuits. The programmable native transmission network is connected to the input/output circuits and is connected between the input/output circuits and the programmable logic region.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
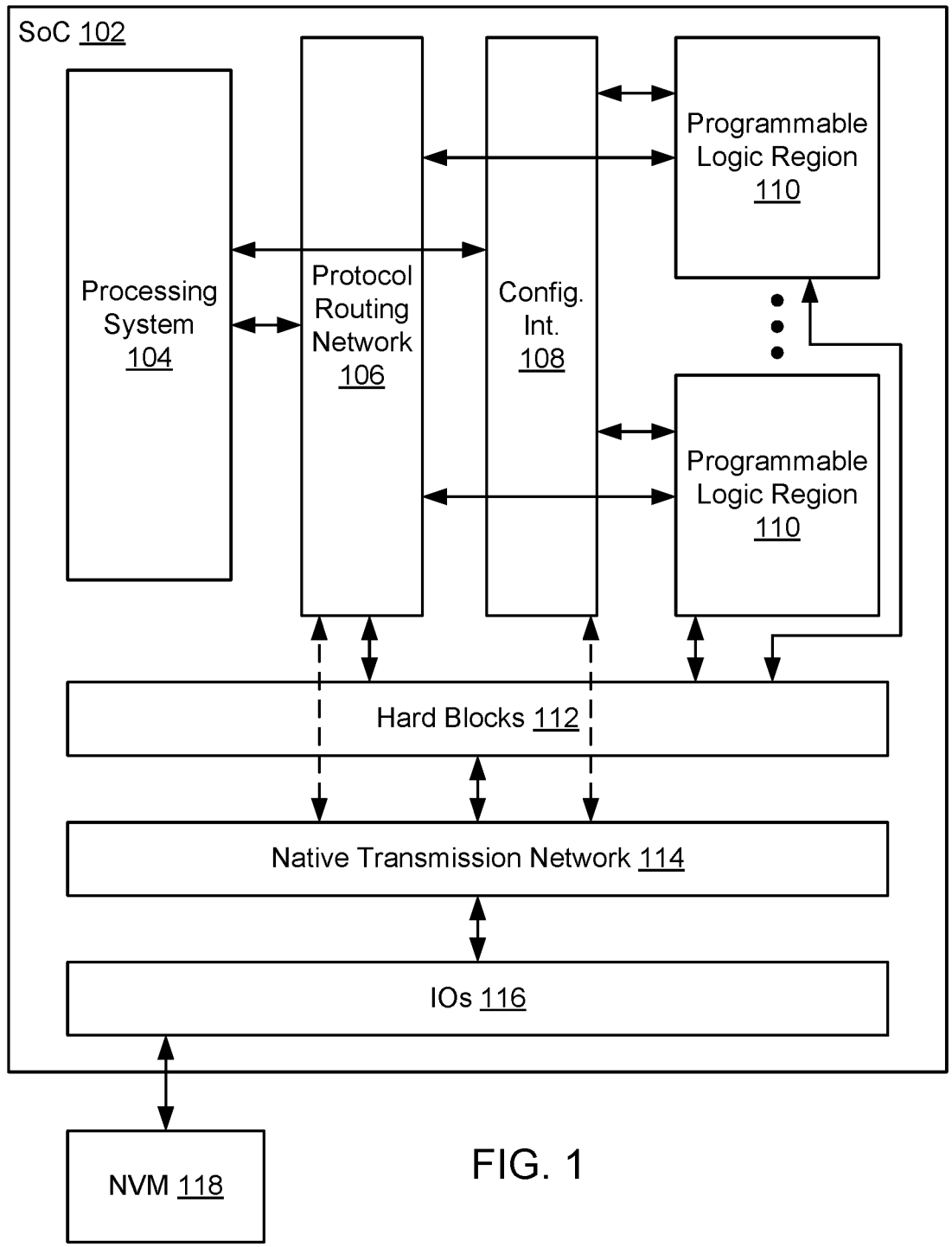
FIG. 1 is a block diagram depicting a System-on-Chip (SoC) according to some examples.

Examples described herein generally relate to a layered boundary interconnect in an integrated circuit (IC) and methods for operating such IC. In some examples, multiple layers of a boundary interconnect are implemented between periphery interfaces and one or more programmable logic regions in a layout of an IC. The layered boundary interconnect can efficiently and flexibly transmit signals between the periphery interfaces and the programmable logic regions and/or other circuits and can permit use of a corner area of the layout, among other possible benefits.

In some examples, a first layer inside input/output blocks in the layout of the IC is a native transmission network that can communicatively couple a native interface of any input/output block to multiple hard block circuits (e.g., not just the adjacent hard block circuit). The native transmission network can communicatively couple the native interface of any input/output block to interfaces of the programmable logic region (e.g., not just the closest interface). The native transmission network also allows signals from the input/output blocks to travel long distances parallel to a boundary of the programmable logic region efficiently, which may avoid congestion in the programmable logic region. The native transmission network may permit input/output blocks to be disposed in corners of a layout of the IC. A second layer is a protocol routing network, such as a communication network of a Network-on-Chip (NoC). A protocol interface block may be implemented in the protocol routing network to enter or exit the network. A third layer is a boundary logic interface (BLI) within or outside of the programmable logic region. A BLI may be an interface of the programmable logic region and may be implemented to increase bandwidth of a vertical interface of the programmable logic region, for example. In some examples, the programmable logic region has less bandwidth vertically than horizontally, and accordingly, insertion of a vertical protocol routing network along the programmable logic region to access horizontal interfaces of the programmable logic region can be beneficial.

Hard block circuits can have connections to the native transmission network and to the protocol routing network. The connections of the input/output blocks to the native transmission network are native, and the connections of the hard block circuits to the protocol routing network implement a protocol. It may be possible for the protocol interface of the hard block circuits to flow through the protocol routing network to the adjacent programmable logic region through a BLI. The protocol interfaces between a hard block circuit (or other circuit) and the programmable logic region can be a NoC master unit (NMU) and NoC slave unit (NSU) if a NoC is implemented as the protocol routing network and implements a packet protocol, for example.

Having a native transmission network between the input/output blocks and hard block circuits and having a protocol routing network between hard block circuits and a programmable logic region can maximize the diversity of hard block circuits that may be implemented, can reduce the amount of routing in an interconnect network of the programmable logic region to align input/output blocks to respective hard block circuits, can reduce the amount of routing in an interconnect network of the programmable logic region to align input/output blocks of BLI to the programmable logic region, can enable multiple input/output blocks to use the same BLI to make testing and optimization of input/output blocks easier, and can make corner input/output blocks usable. The native transmission network can be programmable and flexible and can use less area, cause less latency, and consume less power compared to a programmable logic region having an interconnect network able to route signals comparable to the transmission of signals in the native transmission network. A native transmission network may have an area that is 20% of the area of a programmable logic region having an interconnect network able to route signals comparable to the transmission of signals in the native transmission network.

Aspects of these and other examples are described below. Additional or other benefits may be achieved by various examples, as a person having ordinary skill in the art will readily understand upon reading this disclosure.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations. Even further, various directions or orientations are described as, e.g., a column and a row; horizontal and vertical; and bottom, top, left, and right. These designations are for ease of description, and other directions or orientations may be implemented.

FIG. 1 is a block diagram depicting a System-on-Chip (SoC) 102 according to some examples. The SoC 102 is an IC that is a programmable logic device, such as a Field Programmable Gate Array (FPGA). The SoC 102 comprises a processing system 104, a protocol routing network 106 (e.g., a NoC), a configuration interconnect 108, one or more programmable logic regions 110, hard block circuits 112, a native transmission network 114, and input/output blocks (IOs) 116.

In general, the processing system 104 is connected to the protocol routing network 106 and the configuration interconnect 108. The protocol routing network 106 and the configuration interconnect 108 are connected to the programmable logic region(s) 110.

The processing system 104 can include one or more processor cores. For example, the processing system 104 can include a number of ARM-based embedded processor cores. The programmable logic region(s) 110 can include any number of configurable logic blocks, look-up tables, digital signal processing blocks, random access memory (RAM) blocks, UltraRAM blocks, and programmable interconnect elements. The programmable logic region(s) 110 may be programmed or configured using the processing system 104 through the configuration interconnect 108. For example, the configuration interconnect 108 can enable, for example, frame-based programming of the fabric of the programmable logic region(s) 110 by a processor core of the processing system 104 (such as a platform management controller (PMC)).

The protocol routing network 106 is configured to route communications between circuits based on a predefined protocol. In some examples, the protocol can be a packet protocol, an Advanced eXtensible Interface (AXI) protocol, a token ring protocol, and/or the like. For example, as illustrated by examples below, communications can be in a predefined packet format that is capable of identifying a destination and data to be communicated. The protocol routing network 106 can be programmable such that a programmed configuration can determine how packets are routed based on the predefined packet format (e.g., packets can be routed based on an address or identification contained in the packet). The protocol routing network 106, in some examples, is a programmable communication network of a NoC. In some examples, the NoC includes end-to-end Quality-of-Service (QoS) features for controlling data-flows therein. In examples, the NoC first separates data-flows into designated traffic classes. Data-flows in the same traffic class can either share or have independent virtual or physical transmission paths within the programmable communication network. The QoS scheme applies multiple levels of priority across traffic classes. Within and across traffic classes, the NoC applies a weighted arbitration scheme to shape the traffic flows and provide bandwidth and latency that meets the user requirements. Examples of the NoC are discussed further below. In some examples when the protocol routing network 106 is programmable, the protocol routing network 106 can include a peripheral interconnect that is configured to enable programming the protocol routing network 106 therethrough. For example, the processing system 104 (e.g., a PMC) can program the protocol routing network 106 via the peripheral interconnect.

The input/output blocks 116 can be coupled to circuits exterior to the SoC 102, such as nonvolatile memory (NVM) 118. The input/output blocks 116 are connected to the native transmission network 114. The native transmission network 114 is further connected to the hard block circuits 112. The hard block circuits 112 are connected to the protocol routing network 106 and to the programmable logic region(s) 110. The hard block circuits 112 can communicate via the protocol routing network 106 with other circuits, such as the processing system 104 and the programmable logic region(s) 110. Additionally, the hard block circuits 112 can communicate with the programmable logic region(s) 110 by direct connection(s) to the programmable logic region(s) 110.

The input/output blocks 116 can be or include eXtreme Performance Input/Outputs (XPIOs), multi-gigabit transceivers (MGTs), analog-to-digital converters (ADCs), digital-to-analog converters (DACs), high bandwidth memory (HBM) interfaces, registers, flip-flops, and/or any other general or specialized input/output blocks. The hard block circuits 112 can be or include memory controllers (such as double data rate (DDR) memory controllers, HBM memory controllers, or the like), peripheral component interconnect express (PCIe) blocks, Ethernet cores (such as a 100 Gbps (C=100) media address controller (CMAC), a multi-rate MAC (MRMAC), or the like), forward error correction (FEC) blocks, an array of digital processing engines (DPEs), specialized or general processor cores, and/or any other hardened circuit.

The native transmission network 114 is programmable and is capable of being programmed to selectively transmit signals between circuits in any native format. For example, as illustrated by examples below, signals input to the native transmission network 114 are transmitted therethrough without reference to any predefined format. In some examples, such as illustrated below, the native transmission network 114 includes interconnected switches, multiplexers, and/or demultiplexers where the switches, multiplexers, and/or demultiplexers are programmable to selectively transmit signals according to a configuration. The native transmission network 114 can be connected to (as illustrated by dashed lines in FIG. 1) the configuration interconnect 108 and/or the peripheral interconnect of the protocol routing network 106 for programming the native transmission network 114. For example, the processing system 104 (e.g., a PMC) can program the native transmission network 114 via the configuration interconnect 108 and/or the peripheral interconnect. A configuration of the native transmission network 114 can cause a signal to be transmitted from any predetermined input/output block 116 to any predetermined hard block circuit 112, and vice versa.

The hard block circuits 112 can have bypass circuitry that permit signals to be communicated between the native transmission network 114 and the programmable logic regions 110 and/or protocol routing network 106. When a bypass mode is enabled, effectively, signals can be communicated, via the native transmission network 114 and hard block circuits 112, between the input/output blocks 116 and the programmable logic region(s) 110 to bypass the protocol routing network 106. When communicating a signal between an input/output block 116 and a programmable logic region 110, processing by the hard block circuits 112 can be bypassed to communicate the signals with the programmable logic region(s) 110.

Figure 2:
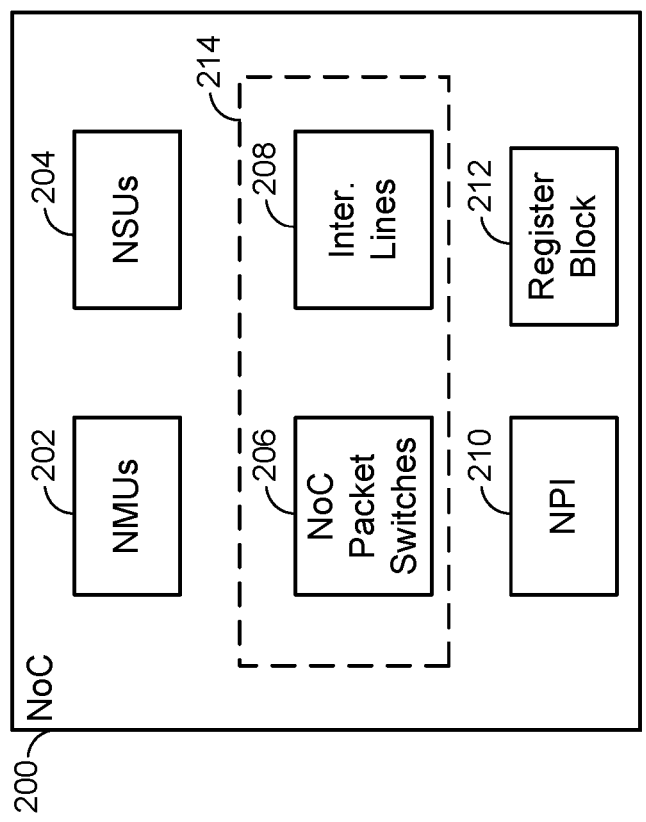
FIG. 2 is a block diagram depicting a Network-on-Chip (NoC) as an example of a protocol routing network of a SoC according to some examples.

FIG. 2 is a block diagram depicting a NoC 200 as an example of the protocol routing network 106 of a SoC according to some examples. The NoC 200 can be implemented according to a NoC packet protocol (NPP). The NoC 200 includes NMUs 202, NSUs 204, a programmable communication network 214, NoC peripheral interconnect (NPI) 210, and register blocks 212. Each NMU 202 is an ingress circuit that connects a master circuit to the NoC 200. Each NSU 204 is an egress circuit that connects the NoC 200 to a slave endpoint circuit. The NMUs 202 are coupled to the NSUs 204 through the programmable communication network 214. In some examples, the programmable communication network 214 includes NoC packet switches 206 and interconnect lines 208 (e.g., metal lines and/or vias) between the NoC packet switches 206. Each NoC packet switch 206 performs switching of NoC packets. The NoC packet switches 206 are connected to each other and to the NMUs 202 and NSUs 204 through the interconnect lines 208 to implement a plurality of physical channels. The NoC packet switches 206 also support multiple virtual channels per physical channel. The NPI 210 includes circuitry to write to register blocks 212 that determine the functionality of the NMUs 202, NSUs 204, and NoC packet switches 206. The NPI 210 includes a peripheral interconnect coupled to the register blocks 212 for programming thereof to set functionality. The register blocks 212 in the NoC 200 support interrupts, QoS, error handling and reporting, transaction control, power management, and address mapping control.

Figure 3:
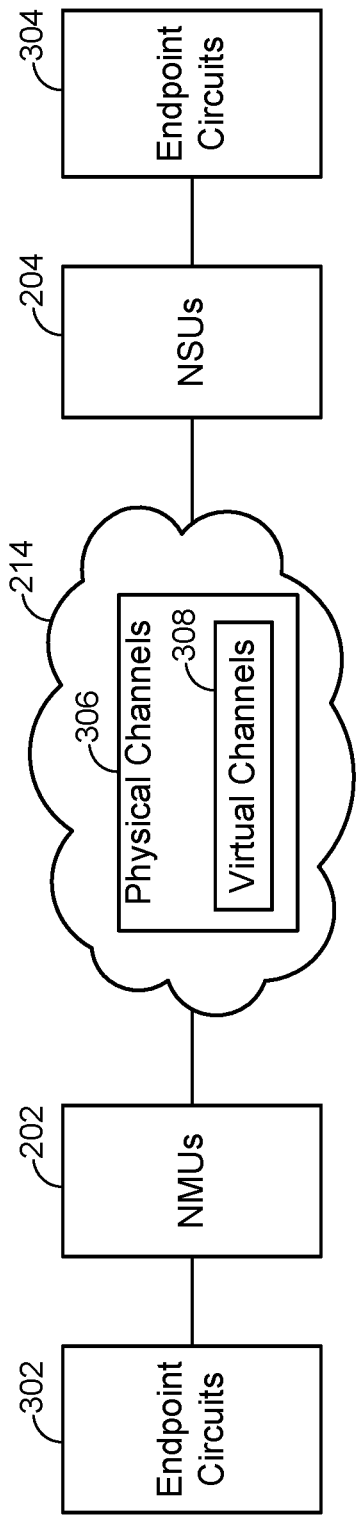
FIG. 3 is a block diagram depicting connections between endpoint circuits in a SoC through a NoC according to some examples.

FIG. 3 is a block diagram depicting connections between endpoint circuits in a SoC 102 through the NoC 200 of FIG. 2 according to some examples. In the example, endpoint circuits 302 are connected to endpoint circuits 304 through the NoC 200. The endpoint circuits 302 are master circuits, which are coupled to NMUs 202 of the NoC 200. The endpoint circuits 304 are slave circuits coupled to the NSUs 204 of the NoC 200. Each endpoint circuit 302 and 304 can be a circuit in the processing system 104, a circuit in a programmable logic region 110, or a circuit in another subsystem. Each endpoint circuit in the programmable logic region 110 can be a dedicated circuit (e.g., a hardened circuit) or a circuit configured in programmable logic.

The programmable communication network 214 includes a plurality of physical channels 306. The physical channels 306 are implemented by programming the NoC 200. Each physical channel 306 includes one or more NoC packet switches 206 and associated interconnect lines 208. An NMU 202 connects with an NSU 204 through at least one physical channel 306. A physical channel 306 can also have one or more virtual channels 308. The virtual channels 308 can implement weights to prioritize various communications along any physical channel 306.

Figure 4:
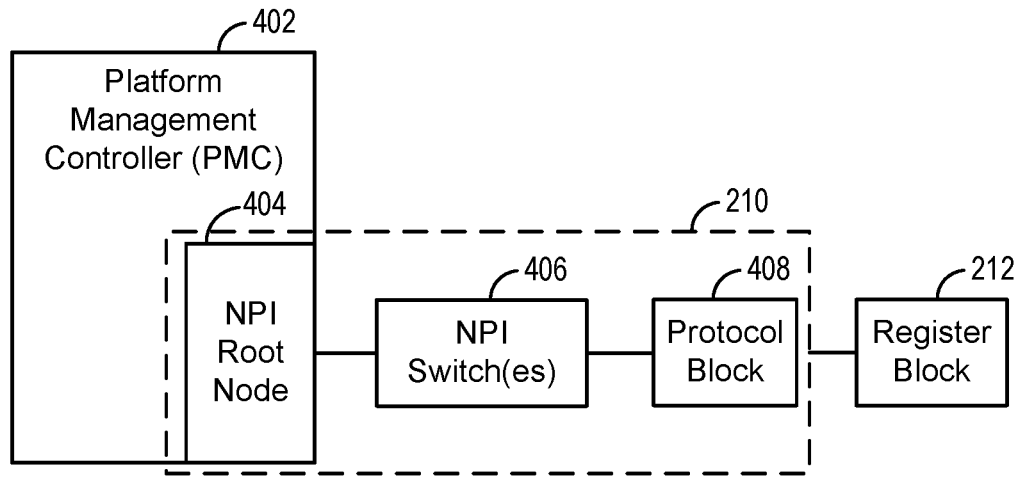
FIG. 4 is a block diagram depicting connections to a register block through a NoC peripheral interconnect (NPI) according to some examples.

FIG. 4 is a block diagram depicting connections to a register block 212 of, e.g., an NMU 202, NoC packet switch 206, or NSU 204 through the NPI 210 in a SoC 102 according to some examples. To connect to a register block 212, the NPI 210 includes an NPI root node 404, interconnected NPI switches 406, and a protocol block 408. The NPI root node 404 resides on a platform management controller (PMC) 402, which resides in the processing system 104 of the SoC 102.

Generally, the NPI root node 404 can packetize a transaction request, such as a write or read request, into a format implemented by the NPI 210 and can transmit a memory-mapped transaction request to interconnected NPI switches 406. The transaction request can be routed through the interconnected NPI switches 406 to a protocol block 408 connected to the register block 212 to which the transaction request is directed. The protocol block 408 can then translate the memory-mapped transaction request into a format implemented by the register block 212 and transmit the translated request to the register block 212 for processing. The register block 212 can further transmit a response to the transaction request through the protocol block 408 and the interconnected NPI switches 406 to the NPI root node 404, which then responds to the master circuit that issued the transaction request.

The NPI root node 404 can translate a transaction request between a protocol used by the one or more master circuits, such as the PMC 402, and a protocol used by the NPI 210. For example, the master circuits can implement the Advanced eXtensible Interface fourth generation (AXI4) protocol, and the NPI 210 can implement an NPI Protocol. The protocol blocks 408 can also translate the transaction request from the protocol implemented on the NPI 210 to a protocol implemented by the register blocks 212 of the NoC packet switches 206. In some examples, the protocol blocks 408 can translate between NPI Protocol and the Advanced Microcontroller Bus Architecture (AMBA) 3 Advanced Peripheral Bus (APB3) protocol.

Figure 5:
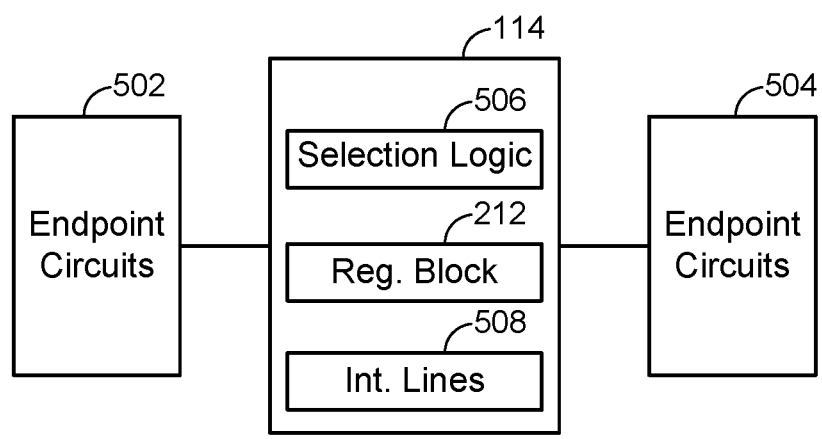
FIG. 5 is a block diagram depicting connections between endpoint circuits in a SoC through a native transmission network according to some examples.

FIG. 5 is a block diagram depicting connections between endpoint circuits in a SoC 102 through the native transmission network 114 according to some examples. In the example, endpoint circuits 502 are connected to endpoint circuits 504 through the native transmission network 114. Each endpoint circuit 502 and 504 can be a circuit of the input/output blocks 116, the hard block circuits 112, or a circuit in another subsystem.

The native transmission network 114 includes selection logic 506, a register block(s) 212, and interconnect lines 508. The interconnect lines 508 interconnects the selection logic 506. The selection logic 506 can each be or include an M:N multiplexer, N number of M:1 multiplexers, an X:Y demultiplexer, X number of 1:Y demultiplexers, and/or other switches, for example. The selection logic 506 can each consist of one or more multiplexers, one or more demultiplexers, and/or switches. Physical channels in the native transmission network 114 can be implemented by programming a register block 212 (or other memory) associated with each selection logic 506. The values stored in the register block(s) 212 (or other memory) can be input as respective select or control signals to the selection logic 506 to thereby program the physical channels.

Figure 6:
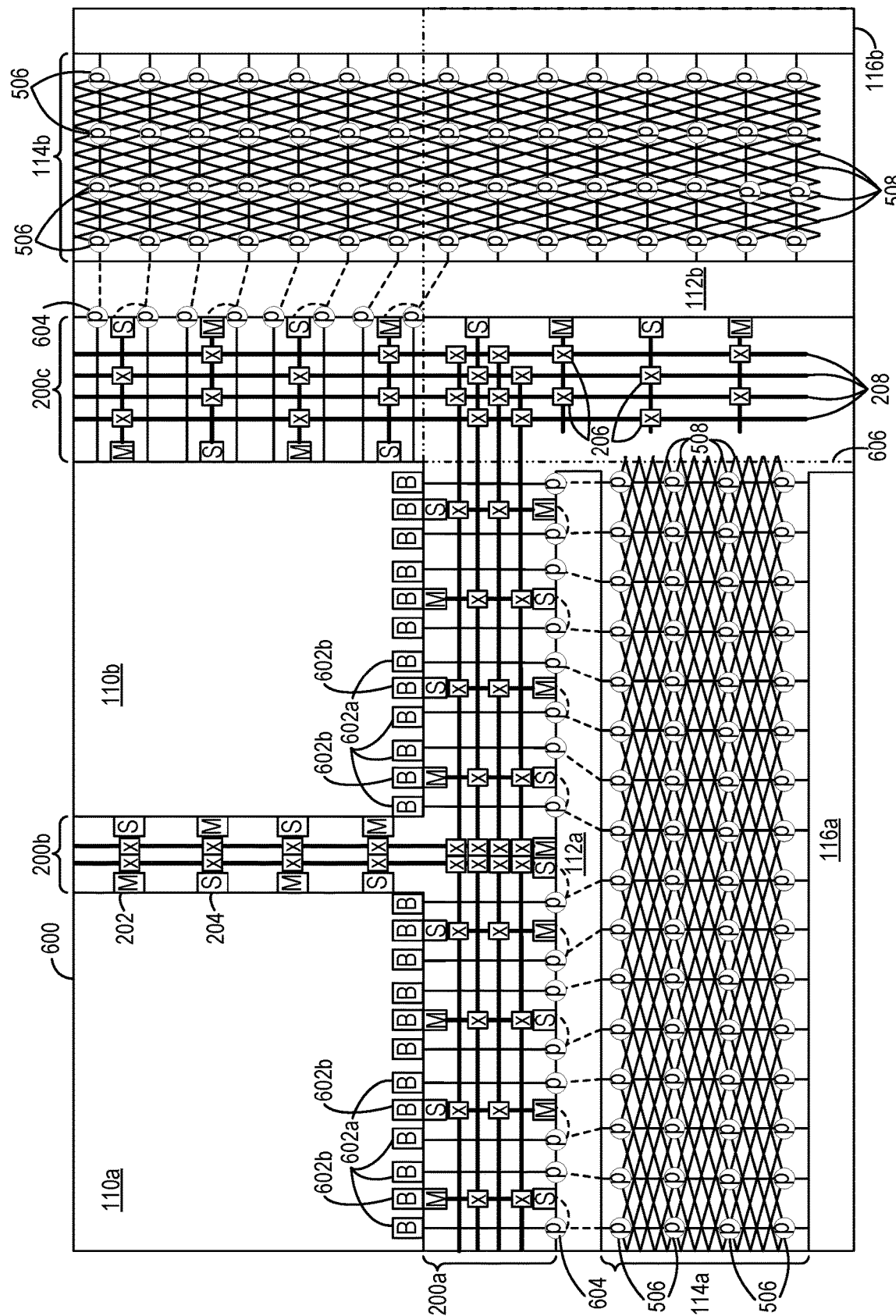
FIG. 6 is an example schematic layout of a corner portion of a SoC according to some examples.

FIG. 6 is an example schematic layout of a corner portion 600 of the SoC 102 according to some examples. The corner portion 600 is a portion of a layout of the IC (e.g., layout of the die) of the SoC 102. Various components illustrated in FIG. 6 are not indicated by a reference numeral so as to not obscure features illustrated therein. A person having ordinary skill in the art will readily understand other circuits or features that may be included in the corner portion 600.

The corner portion 600 includes (at least portions of) programmable logic regions 110a, 110b, hard block circuits 112a, 112b, input/output blocks 116a, 116b, native transmission network portions 114a, 114b (collectively, native transmission network 114), and NoC portions 200a, 200b, 200c (collectively, NoC 200) (e.g., protocol routing network). The horizontal input/output blocks 116a are along a horizontal edge of the layout that forms a corner of the corner portion 600, and the vertical input/output blocks 116b are along a vertical edge of the layout that forms a corner of the corner portion 600. The horizontal hard block circuits 112a generally extend longitudinally parallel to the horizontal input/output blocks 116a, and the vertical hard block circuits 112b generally extend longitudinally parallel to the vertical input/output blocks 116b. The horizontal native transmission network portion 114a is generally disposed between the horizontal hard block circuits 112a and the horizontal input/output blocks 116a, and the vertical native transmission network portion 114b is generally disposed between the vertical hard block circuits 112b and the vertical input/output blocks 116b. The horizontal NoC portion 200a extends generally horizontally and between (i) the horizontal hard block circuits 112a and (ii) the programmable logic regions 110a, 110b. The first vertical NoC portion 200b extends generally vertically and between the programmable logic region 110a and the programmable logic region 110b. The second vertical NoC portion 200c extends generally vertically and between (i) the vertical hard block circuits 112b and (ii) the programmable logic region 110b and other components.

In some examples, the programmable logic regions 110a, 110b have a columnar architecture. The programmable logic regions 110a, 110b can include columns of configurable logic blocks (CLBs), columns of look-up-table RAMs (LUTRAMs), columns of digital signal processing blocks (DSPs), columns of random access memory blocks (BRAMs), UltraRAM blocks (URAMs), and/or the like. The programmable logic regions 110a, 110b include columns of programmable interconnect elements, where each column neighbors or is associated with a column of logic blocks (e.g., CLBs, etc.). Each logic block in a column of logic blocks is connected to one or more programmable interconnect elements in a neighboring or associated column of programmable interconnect elements. Each programmable interconnect element is connected to respective vertically neighboring programmable interconnect elements in the column and to respective horizontally neighboring programmable interconnect elements in neighboring columns of programmable interconnect elements. The interconnected programmable interconnect elements form an interconnect network within the programmable logic regions 110a, 110b. A BLI 602a, 602b (each labeled with a "B" in FIG. 6) is within and at a horizontal boundary of the programmable logic region 110a, 110b, and at each end of each column of programmable interconnect elements. The BLI 602a, 602b include logic circuits that are programmable and permit selective transmission of signals between the programmable logic region 110a, 110b and another circuit.

The NoC 200 includes NMUs 202 (each labeled with an "M") and NSUs 204 (each labeled with an "S") interconnected via NoC packet switches 206 (each labeled with an "X") and interconnect lines 208. The NoC packet switches 206 and interconnect lines 208 form the programmable communication network 214 of the NoC 200. Various NMUs 202 and NSUs 204 interface vertically with respective BLIs 602b at horizontal boundaries of the programmable logic regions 110a, 110b. Hence, those NMUs 202 and NSUs 204 can communicate vertically with the interconnect network of the programmable logic region via the BLIs 602b. Other NMUs 202 and NSUs 204 interface horizontally with programmable interconnect elements (e.g., without a BLI), and hence, with the interconnect network of the programmable logic region. Further, other NMUs 202 and NSUs 204 interface with the hard block circuits 112a, 112b and, possibly, other circuits, components, and/or subsystems. For example, the programmable communication network 214 of the NoC 200 permits communications between (i) hard block circuits 112 and the programmable logic region 110, (ii) hard block circuits 112 and other hard block circuits 112, and (iii) programmable logic region 110 and programmable logic region 110 (e.g., between different logic elements in the programmable logic region 110 and/or different programmable logic regions 110). The various circuits that interface with the NoC 200 by the NMUs 202 and NSUs 204 are capable of communicating via the programmable communication network 214 of the NoC 200, and communications (e.g., NoC packets) transmitted via the programmable communication network 214 of the NoC 200 are formatted (e.g., at an NMU 202 and/or NSU 204) and routed based on a NoC protocol (e.g., NoC Packet Protocol) or other high level protocol.

The native transmission network 114 includes selection logic 506 (each labeled with a "P" in FIG. 6) interconnected by interconnect lines 508. The interconnect lines 508 can be individual or singular lines or may be multiple lines that form a bus. The horizontal native transmission network portion 114a interfaces with the horizontal input/output blocks 116a and the horizontal hard block circuits 112a. The vertical native transmission network portion 114b interfaces with the vertical input/output blocks 116b and the vertical hard block circuits 112b. The native transmission network portions 114a, 114b are programmable to transmit signals between the input/output blocks 116a, 116b and the hard block circuits 112a, 112b, respectively, via selection logic 506 and interconnect lines 508.

The hard block circuits 112a, 112b include selection logic 604 (each labeled with a "P" in FIG. 6) that enables one or more bypass modes. Different ones of the selection logic 604 can be connected to the native transmission network portions 114a, 114b, the programmable logic regions 110a, 110b, and/or NoC portions 200a, 200b. Some of the selection logic 604 of horizontal hard block circuits 112a interface with respective BLIs 602a at horizontal boundaries of the programmable logic regions 110a, 110b. Some of the selection logic 604 of vertical hard block circuits 112b interface with programmable interconnect elements (e.g., without a BLI) of the programmable logic region 110b. Some of the selection logic 604 of horizontal hard block circuits 112a interface with NMUs 202 or NSUs 204 of the horizontal NoC portion 200a, and some of the selection logic 604 of vertical hard block circuits 112b interface with NMUs 202 or NSUs 204 of the second vertical NoC portion 200c. The hard block circuits 112a, 112b are programmable to enable or disable the bypass mode(s). Some example configurations of the selection logic 604, and how the selection logic 604 may interface with the native transmission network portions 114a, 114b, the programmable logic regions 110a, 110b (e.g., including BLIs 602a), and/or NoC portions 200a, 200b (e.g., NMUs 202 and/or NSUs 204) are illustrated in and described below with respect to FIGS. 7A and 7B.

Generally, the hard block circuits 112a, 112b are programmable to selectively bypass, in a first bypass mode, the programmable communication network 214 of the NoC 200. In some examples, NMUs 202 and NSUs 204 of the NoC 200 are configured to communicate with the hard block circuits 112 according to a first protocol (e.g., an AXI protocol), and the NMUs 202 and NSUs 204 translate communications with the hard block circuits 112 between the first protocol and a second protocol (e.g., a NoC Packet Protocol) that is implemented by the programmable communication network 214 of the NoC 200. When the first bypass mode is not enabled, the hard block circuits 112a, 112b can be configured to receive a native signal from the native transmission network portion 114a, 114b and process the native signal into the first protocol signal for transmission to an NMU 202 or NSU 204, or vice versa. When the first bypass mode is enabled, the hard block circuits 112a, 112b can be configured to receive a native signal from the native transmission network portion 114a, 114b and transmit to a programmable logic region 110 the native signal or the first protocol signal resulting from processing the native signal, or vice versa, which bypasses the programmable communication network 214 of the NoC 200.

When the first bypass mode is enabled, the hard block circuits 112a, 112b are programmable to selectively bypass, in a second bypass mode, processing of the hard block circuits 112a, 112b. In some examples, the programmable logic region 110 is configured to receive or generate native signals or first protocol signals, e.g., based on the programmed logic instantiated on the programmable logic region 110. If the programmable logic region 110 is configured to receive or generate first protocol signals, the hard block circuits 112a, 112b can be configured to process received signals to reformat signals between the native format and the first protocol. If the programmable logic region 110 is configured to receive or generate native signals, the hard block circuits 112a, 112b can be configured, in the second bypass mode, to bypass the processing of the hard block circuits 112a, 112b.

Figure 7A:
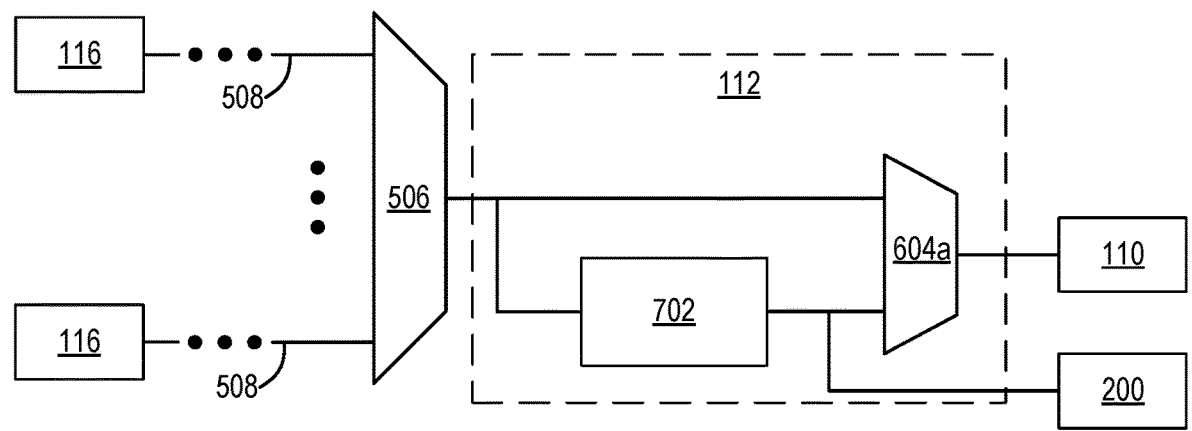
FIG. 7A is a circuit schematic illustrating an example configuration of a hard block circuit for enabling one or more bypass modes according to some examples.

FIG. 7A is a circuit schematic illustrating an example configuration of a hard block circuit 112 for enabling one or more bypass modes according to some examples. In the illustrated example of FIG. 7A, a signal is transmitted from respective input/output blocks 116 to the hard block circuit 112. A signal is transmitted from the hard block circuit 112 to a programmable logic region 110, and a signal is transmitted from the hard block circuit 112 to the NoC 200. A bypass mode can permit bypassing transmitting a signal through the NoC 200, and another bypass mode can permit bypassing processing of the hard block circuit 112.

As shown in FIG. 7A, various interconnect lines 508 of the native transmission network 114, which are coupled to various ones of the input/output blocks 116, are connected to input nodes of selection logic 506 (e.g., N:1 multiplexer). An output node of the selection logic 506 is connected to an input node of the hard block circuit 112, which is connected to an input node of a hard block processing circuit 702 and to an input node of selection logic 604a (e.g., 2:1 multiplexer). An output node of the hard block processing circuit 702 is connected to another input node of the selection logic 604a and to the NoC 200 (e.g., an NMU 202 or an NSU 204). An output node of the selection logic 604a is connected to the programmable logic region 110 (e.g., a BLI 602a and/or a programmable interconnect element). A select signal input on a select node of the selection logic 604a determines whether the signal output by the selection logic 506 or the signal output by the hard block processing circuit 702 is transmitted to the programmable logic region 110.

If the signal output by the hard block processing circuit 702 is selectively transmitted, via selection logic 604a, to the programmable logic region 110, that signal may result from processing of the signal output by the selection logic 506 by the hard block processing circuit 702 of the hard block circuit 112. If the signal output by the selection logic 506 is selectively transmitted, via selection logic 604a, to the programmable logic region 110, the hard block processing circuit 702 of the hard block circuit 112 (and processing by the hard block circuit 112) may be selectively bypassed. The signal output by the hard block processing circuit 702 is input to the NoC 200 (e.g., NMU 202 or NSU 204).

A signal can be transmitted through the NoC 200. For example, a native signal received at the hard block circuit 112 from the selection logic 506 is processed by the hard block processing circuit 702, and the processed signal is output to the NoC 200 (e.g., NMU 202 or NSU 204) by the hard block processing circuit 702. The processing by the hard block processing circuit 702 can reformat the native signal into a first protocol format, such as an AXI protocol. The NMU 202 or NSU 204 can be programmed to reformat the received signal from the first protocol to a second protocol (e.g., a NoC Packet Protocol), and can transmit the signal in the second protocol to the programmable communication network 214 of the NoC 200. This signal can then be routed through the programmable communication network 214 to a target endpoint circuit, which may include a programmable logic region 110 (e.g., at some distant region) or another subsystem.

Transmitting a signal through the programmable communication network 214 of the NoC 200 can be bypassed, in a first bypass mode, via the selection logic 604a of FIG. 7A. The NoC 200 can be bypassed, e.g., when the output node of the selection logic 604a is directly connected to the programmable logic region 110 (e.g., to a BLI 602a and/or a programmable interconnect element). In such examples, the NMU 202 or NSU 204 of the NoC 200 to which the hard block processing circuit 702 is connected may be programmed to disable functionality of that NMU 202 or NSU 204, which may prevent that NMU 202 or NSU 204 from transmitting a signal to the programmable communication network 214 of the NoC 200.

When the first bypass mode is enabled, the selection logic 604a can be selectively configured, in a second bypass mode, to transmit to the programmable logic region 110 the signal received from the selection logic 506 or the processed signal from the hard block processing circuit 702. The programmable logic region 110 may be capable of receiving a native signal or a first protocol signal, e.g., based on the programmed logic instantiated on the programmable logic region 110. Continuing the example from above, the hard block processing circuit 702 processes the native signal into the first protocol (e.g., an AXI protocol), and the native signal or the first protocol signal is selectively transmitted to the programmable logic region 110. Hence, processing by the hard block processing circuit 702 can be selectively bypassed.

Figure 7B:
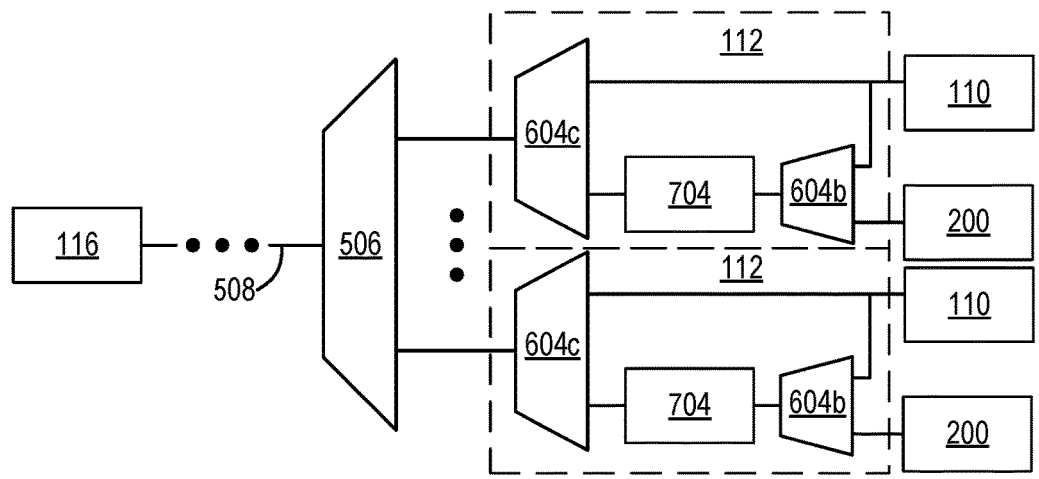
FIG. 7B is a circuit schematic illustrating an example configuration of a hard block circuit for enabling one or more bypass modes according to some examples.

FIG. 7B is a circuit schematic illustrating an example configuration of a hard block circuit 112 for enabling one or more bypass modes according to some examples. In the illustrated example of FIG. 7B, respective signals are transmitted from a programmable logic region 110 and the NoC 200 to the hard block circuits 112, and a signal is transmitted from the hard block circuit 112 to an input/output block 116. A bypass mode can permit bypassing receiving a signal from the NoC 200, and another bypass mode can permit bypassing processing of the hard block circuit 112.

As shown in FIG. 7B, respective programmable logic regions 110 (e.g., a BLI 602a and/or a programmable interconnect element) are connected to respective first input nodes of hard block circuits 112. Each first input node of the hard block circuits 112 is connected to a respective input node of selection logic 604b (e.g., 2:1 multiplexer) and to a respective input node of selection logic 604c (e.g., 2:1 multiplexer). The NoC 200 (e.g., NMUs 202 and/or NSUs 204) are connected to respective second input nodes of hard block circuits 112. Each second input node of the hard block circuits 112 is connected to another respective input node of selection logic 604b. Respective output nodes of the selection logic 604b are connected to a respective input node of a hard block processing circuit 704. A respective output node of the hard block processing circuit 704 is connected to another respective input node of the selection logic 604c. Output nodes of the selection logic 604c are connected to input nodes of selection logic 506 (e.g., N:1 multiplexer). An output node of the selection logic 506 is coupled, via interconnect lines 508 and other selection logic 506, to an input node of an input/output block 116.

A select signal input on a select node of the selection logic 604b determines whether the respective signal output by the programmable logic region 110 or the respective signal output by the NoC 200 is input to the hard block processing circuit 704. If the signal output by the programmable logic region 110 is selectively output by the selection logic 604b, that signal output by the programmable logic region 110 may be processed by the hard block processing circuit 704. If the signal output by the NoC 200 is selectively output by the selection logic 604b, that signal output by the NoC 200 may be processed by the hard block processing circuit 704.

A select signal input on a select node of the selection logic 604c determines whether the respective signal output by the programmable logic region 110 or the respective signal output by the hard block processing circuit 704 is input to the selection logic 506. If the signal output by the hard block processing circuit 704 of the hard block circuit 112 is selectively input to the selection logic 506, via selection logic 604c, that signal may result from processing of the signal output by the programmable logic region 110 or NoC 200 by the hard block processing circuit 704 of the hard block circuit 112. If the signal output by programmable logic region 110 is input to the selection logic 506, via selection logic 604c, the hard block processing circuit 704 of the hard block circuit 112 (and processing by the hard block circuit 112) may be selectively bypassed.

A signal can be transmitted through the NoC 200. For example, a signal in the second protocol (e.g., a NoC Packet Protocol), as described above, can be routed through the programmable communication network 214 from a source endpoint circuit, which may include a programmable logic region 110 (e.g., at some distant region) or another subsystem, to an NMU 202 or NSU 204 connected to the hard block circuit 112. The NMU 202 or NSU 204 can be programmed to reformat the signal from the second protocol to the first protocol (e.g., an AXI protocol) and transmit the signal in the first protocol to the hard block circuit 112. The selection logic 604b can be configured to transmit the signal in the first protocol received from the NMU 202 or NSU 204 to the hard block processing circuit 704. The signal can be processed by the hard block processing circuit 704 to translate the signal in the first protocol to a native signal, which is output by the hard block processing circuit 704 to the selection logic 604c. The selection logic 604c can selectively transmit the native signal from the hard block processing circuit 704.

Transmitting a signal through the programmable communication network 214 of the NoC 200 can be bypassed, in a first bypass mode, via the selection logic 604b, 604c of FIG. 7B. The NoC 200 can be bypassed, e.g., when the respective input nodes of the selection logic 604b, 604c are directly connected to the programmable logic region 110 (e.g., to a BLI 602a and/or a programmable interconnect element). In such examples, the NMU 202 or NSU 204 of the NoC 200 to which the hard block processing circuit 702 is connected may be programmed to disable functionality of that NMU 202 or NSU 204, which may, at least in part, prevent that NMU 202 or NSU 204 from receiving a signal from the programmable communication network 214 of the NoC 200.

The selection logic 604c can be selectively configured to transmit to the selection logic 506 a signal received from the programmable logic region 110 or the native signal from the hard block processing circuit 704. The selection logic 604b can be selectively configured to transmit to the hard block processing circuit 704 the signal received from the programmable logic region 110 (or a signal received from the NMU 202 or NSU 204 of the NoC 200 as described above). The programmable logic region 110 may be capable of generating and transmitting a native signal or a first protocol signal (e.g., an AXI protocol), e.g., based on the programmed logic instantiated on the programmable logic region 110. If the programmable logic region 110 generates a native signal, the native signal can be directly transmitted from the programmable logic region 110 to the selection logic 604c, and the native signal can be selectively output by the selection logic 604c. If the programmable logic region 110 generates a first protocol signal, the first protocol signal can be output by the selection logic 604b to the hard block processing circuit 704, which can process the first protocol signal and output a native signal to the selection logic 604c. The native signal can be selectively output by the selection logic 604c. Processing by the hard block processing circuit 704 can be selectively bypassed, e.g., when the programmable logic region 110 generates a native signal.

Referring back to FIG. 6, the horizontal native transmission network portion 114a is capable of transmitting signals horizontally, and the vertical native transmission network portion 114b is capable of transmitting signals vertically. By providing the capability to transmit signals in such manners, the native transmission network 114 provides flexibility in placing input/output blocks 116 relative to hard block circuits 112 with which the input/output blocks 116 communicate. By extension, the native transmission network 114 provides flexibility in placing input/output blocks 116 when implementing a connection to a programmable logic region 110 through a hard block circuit 112.

In the illustrated example, the horizontal native transmission network portion 114a includes four rows (e.g., parallel to the corresponding horizontal hard block circuits 112a and horizontal input/output blocks 116a) of selection logic 506, and the vertical native transmission network portion 114b includes four rows (e.g., parallel to the corresponding vertical hard block circuits 112b and vertical input/output blocks 116b) of selection logic 506. In other examples, any number of rows of selection logic 506 for each of the native transmission network portions 114a, 114b may be implemented, and the numbers of rows of selection logic 506 for the native transmission network portions 114a, 114b may be the same or may differ. The number of rows of selection logic 506 may be implemented based on a programmable signal transmission specification.

Generally, signals can be transmitted to more and orthogonally further endpoint circuits 502, 504 with more rows (e.g., more layers) of selection logic 506 of the native transmission network 114. Additionally, with more rows of selection logic 506, more paths may be available between any two endpoint circuits 502, 504. With more rows, an increase (e.g., geometric or N! increase) in the number of paths between some endpoint circuits 502, 504 may be formed.

The native transmission network 114 allows input/output blocks 116 to be offset from respective interfaces to the programmable logic region 110. The native transmission network 114 permits the programmable logic region 110 to access input/output blocks 116 disposed in a corner of a layout of an IC. Fewer BLIs 602 may be used for access by the programmable logic region 110 to input/output blocks 116, and each input/output block 116 may have access to the programmable logic region 110. The native transmission network 114 may be more efficient than routing in the interconnect network of the programmable logic region 110. The native transmission network 114 also supports left/right alignment and/or top/bottom alignment. The native transmission network 114 permits distributing bandwidth from input/output blocks 116 across the IC efficiently, particularly, as bandwidth from the input/output blocks 116 continues to grow. The native transmission network 114 allows the bandwidth of input/output blocks 116 to be efficiency distributed around the IC making the bandwidth easier to absorb and prevents saturation of the programmable logic region 110. Further, the native transmission network 114 permits input/output blocks 116 to concentrate signals on in a small region of a programmable logic region 110.

As stated, the native transmission network 114 can permit input/output blocks 116 to be disposed in a corner area 606 of the layout. The corner area 606 is at a corner of the layout defined by the intersecting of the horizontal and vertical edges of the layout. The corner area 606, as illustrated, is defined by (i) a line extending along the vertical boundary of the programmable logic region 110b most proximate to the vertical edge of the layout, (ii) a line extending along the horizontal boundary of the programmable logic region 110b most proximate to the horizontal edge of the layout, (iii) the vertical edge of the layout, and (iv) the horizontal edge of the layout. The corner area 606 may also be referred to as an area in a shadow of orthogonal boundary elements (e.g., outside of the programmable logic regions 110a, 110b), such as the NoC portions 200a, 200b, hard block circuits 112a, 112b, native transmission network portions 114a, 114b, and input/output blocks 116a, 116b. In the illustrated example, some of the vertical input/output blocks 116b are in the shadow of the orthogonal horizontal input/output blocks 116a, horizontal native transmission network portion 114a, horizontal hard block circuits 112a, and horizontal NoC portion 200a.

The native transmission network 114 can allow multiple resources to have access to each BLI 602 (which may further be through a hard block circuit 112). Each input/output block 116 has access to at least one BLI 602a. At least some input/output blocks 116 can have access to multiple BLIs 602a. In some examples, where at least some input/output blocks 116 share a BLI 602a, not all input/output blocks 116 can be connected to a BLI 602a simultaneously. Through the native transmission network 114, input/output blocks 116 can have uniform access to the programmable logic region 110 for test and characterization.

In some examples, the registers (e.g., register block(s) 212) or memory that store the select signals for the selection logic 506, 604 can written through any delivery mechanism or interconnect. For example, in FIG. 6, the selection logic 604 is disposed along the NoC 200 and is programmed by writing via the NPI 210 (not illustrated) of the NoC 200 as described with respect to FIG. 4. The selection logic 506 is disposed between the hard block circuits 112a, 112b and the input/output blocks 116a, 116b, respectively. The selection logic 506 may be programmed by writing via the NPI 210 and/or the configuration interconnect 108 (not illustrated).

In some examples, pipeline registers may be included in the native transmission network 114. Including pipeline registers can permit synchronous data transfer between input/output blocks 116 and other circuits. Clock signals for controlling timing of pipeline registers may be provided by input/output blocks 116, such as MGTs.

Implementing the native transmission network 114 in FIG. 6 permits area that might have been otherwise consumed by a programmable logic region to route signals via an interconnect network of the programmable logic region to be freed. For example, no interconnect network of a programmable logic region is over the hard block circuits 112a, 112b, which permits the hard block circuits 112a, 112b to use more metal layers, e.g., for routing and/or power.

FIGS. 8, 9, 10, and 11 are different example layouts 800, 900, 1000, 1100 of ICs according to some examples. Each of the layouts 800, 900, 1000, 1100 includes a programmable logic region 110. The programmable logic region 110, in the illustrated examples, is a columnar architecture as described previously. The programmable logic region 110 includes BLIs 602 at respective ends of columns of programmable interconnect elements.

Each of the layouts 800, 900, 1000, 1100 includes horizontal protocol routing network portions 106a, 106c and vertical protocol routing network portions 106b, 106d. The horizontal protocol routing network portion 106a extends generally along a bottom boundary of the programmable logic region 110, and the horizontal protocol routing network portion 106c extends generally along a top boundary of the programmable logic region 110. The vertical protocol routing network portion 106b extends generally along a right boundary of the programmable logic region 110, and the vertical protocol routing network portion 106d extends generally along a left boundary of the programmable logic region 110. The protocol routing network portions 106a, 106b, 106c, 106d generally circumscribe the programmable logic region 110.

Each of the layouts 800, 900, 1000, 1100 includes horizontal hard block circuits 112a, 112c and vertical hard block circuits 112b, 112d. The horizontal hard block circuits 112a extends generally along the horizontal protocol routing network portion 106a, and the horizontal hard block circuits 112c extends generally along the horizontal protocol routing network portion 106c. The vertical hard block circuits 112b extends generally along the vertical protocol routing network portion 106b, and the vertical hard block circuits 112d extends generally along the vertical protocol routing network portion 106d.

Each of the layouts 800, 900, 1000, 1100 includes horizontal native transmission network portions 114a, 114c and vertical native transmission network portions 114b, 114d. The horizontal native transmission network portion 114a extends generally along the horizontal hard block circuits 112a, and the horizontal native transmission network portion 114c extends generally along the horizontal hard block circuits 112c. The vertical native transmission network portion 114b extends generally along the vertical hard block circuits 112b, and the vertical native transmission network portion 114d extends generally along the vertical hard block circuits 112d.

Each of the layouts 800, 900, 1000, 1100 includes horizontal input/output blocks 116a, 116c and vertical input/output blocks 116b, 116d. The horizontal input/output blocks 116a extends generally along the horizontal native transmission network portion 114a and a bottom edge of the respective layout, and the horizontal input/output blocks 116c extends generally along the horizontal native transmission network portion 114c and a top edge of the respective layout. The vertical input/output blocks 116b extends generally along the vertical native transmission network portion 114b and a right edge of the respective layout, and the vertical input/output blocks 116d extends generally along the vertical native transmission network portion 114d and a left edge of the respective layout.

Figure 8:
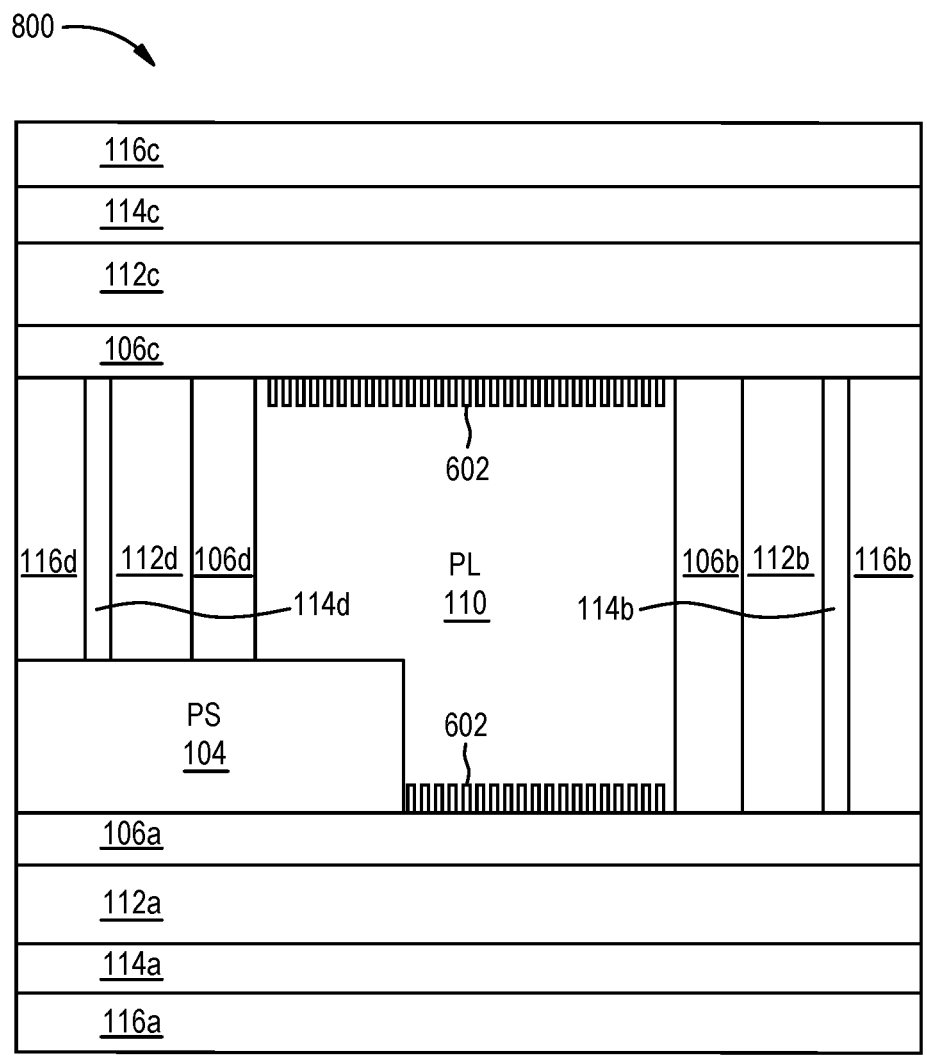
FIGS. 8 through 11 are different layouts of ICs according to some examples.

The layout 800 of FIG. 8 further includes a processing system 104 (e.g., including a PMC) disposed above the horizontal protocol routing network portion 106a and below the vertical input/output blocks 116d, vertical native transmission network portion 114d, vertical hard block circuits 112d, and vertical protocol routing network portion 106d. The processing system 104 is disposed along a left edge of the layout 800 and extends into a bottom left corner of a rectangular area otherwise defined by the programmable logic region 110. The processing system 104 displaces resources of the programmable logic region 110. The processing system 104 may connect to the programmable logic region 110 (e.g., a BLI 602 and/or programmable interconnect element) via the native transmission network 114 (e.g., for close interfaces) and/or the protocol routing network 106 (e.g., for more distant interfaces).

Figure 9:
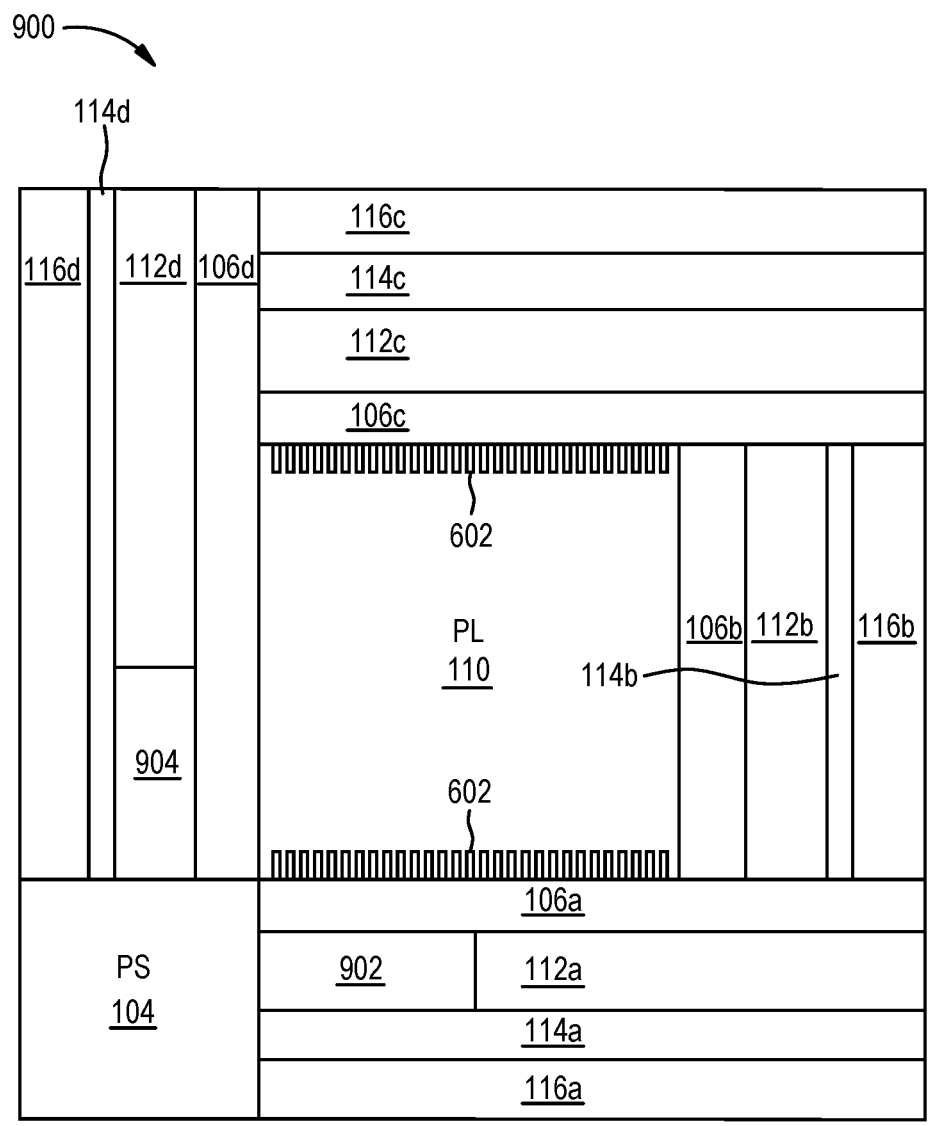
Figure 10:
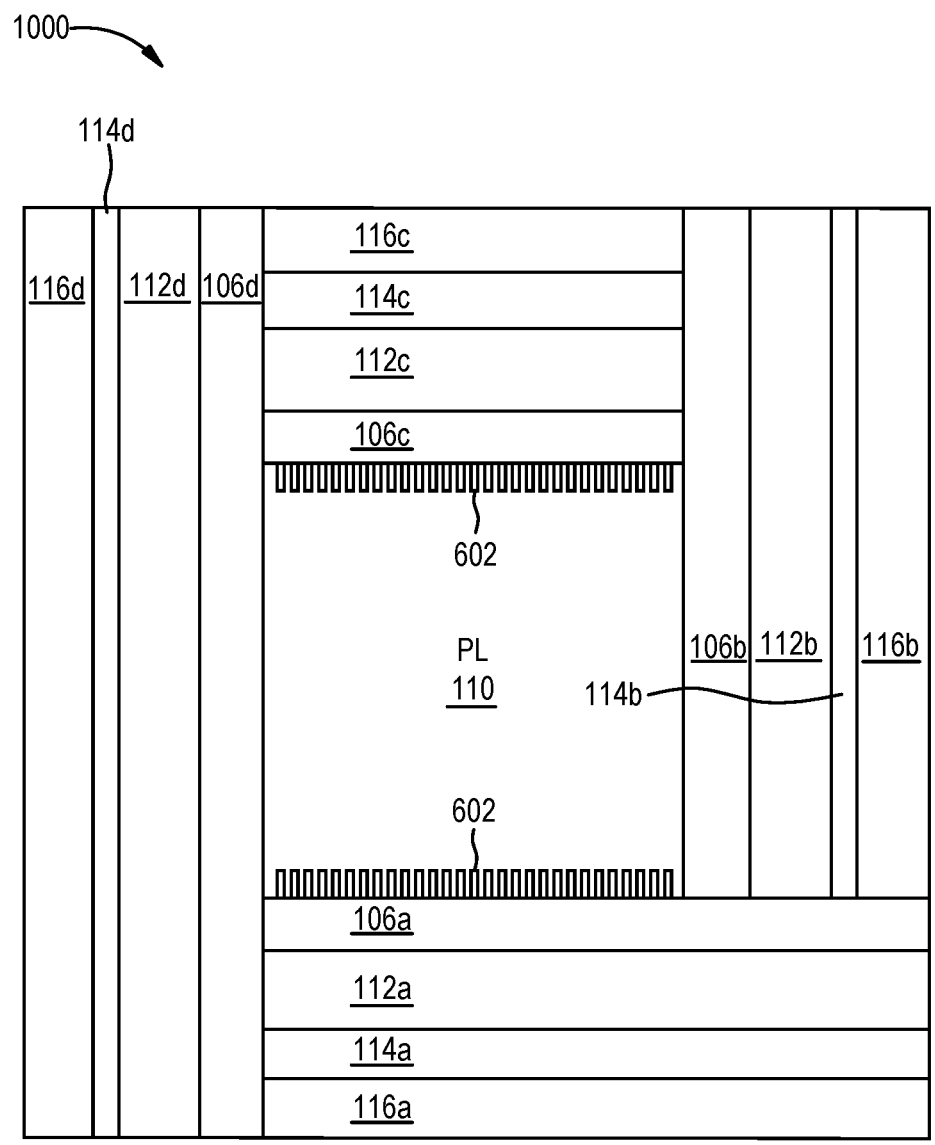

The layout 900 of FIG. 9 further includes a processing system 104 (e.g., including a PMC) in a bottom left corner of the layout 900. The processing system 104 is outside of the programmable logic region 110 in this example. Although shown in the bottom left corner of the layout 900, the processing system 104 can be disposed at any position in the boundary region of the layout 900 outside of the programmable logic region 110. The processing system 104 may connect to the programmable logic region 110 (e.g., a BLI 602 and/or programmable interconnect element) via the native transmission network 114 (e.g., for close interfaces) and/or the protocol routing network 106 (e.g., for more distant interfaces). The layout 900 also includes a graphics processing unit (GPU) and/or real-time processing unit (RPU) (generally, "GPU/RPU") 902 next to the processing system 104 and aligned with the horizontal hard block circuits 112a. The layout 900 further includes a GPU/RPU 904 next to the processing system 104 and aligned with the vertical hard block circuits 112d.

Figure 11:
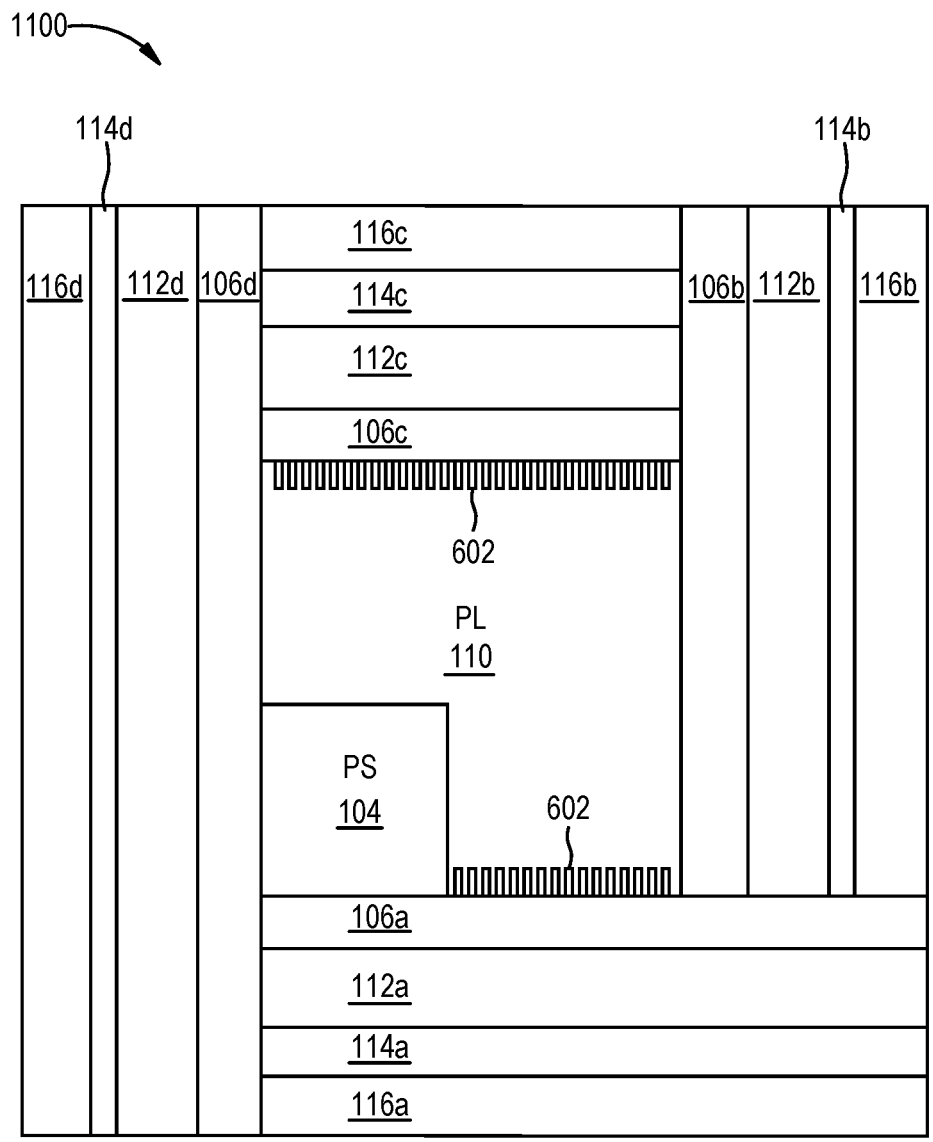

The layout 1100 of FIG. 11 further includes a processing system 104 in a bottom left corner of a rectangular area otherwise defined by the programmable logic region 110, and the processing system 104 displaces resources of the programmable logic region 110.

The layouts 800, 900, 1000, 1100 illustrate example layouts that permit input/output blocks 116 to be disposed in corners of the respective layouts or in shadows of the programmable logic region 110. Signals can be communicated or transmitted to or from input/output blocks 116 in corners or shadows of various other orthogonal boundary circuits, such as hard block circuits 112, protocol routing network 106, and programmable logic region 110. Further, the corners do not have direct access to the programmable logic region 110 and are therefore said to be not aligned to the programmable logic region 110. For example, referring to the layout 800 of FIG. 8, signals can be transmitted horizontally from any input/output block 116 disposed in a corner (or shadow) and a BLI 602 of the programmable logic region 110 through a respective horizontal native transmission network portion 114a, 114c. Additionally, for example, referring to the layout 1000 of FIG. 10, signals can be transmitted vertically from any input/output block 116 disposed in a top corner (or shadow) or a bottom left corner (or shadow) and a programmable interconnect element of the programmable logic region 110 (e.g., without being transmitted through a BLI 602) through a respective vertical native transmission network portion 114*b*, 114*d*. Similarly, signals can be transmitted from any input/output block 116 disposed in a corner or shadow to a hard block circuit 112 via a respective native transmission network portion 114*a*, 114*b*, 114*c*, 114*d*.

More generally, signals can be communicated or transmitted between input/output blocks 116 and various other circuits, such as the programmable logic region 110, that may not align. For example, a signal can be transmitted horizontally in the horizontal native transmission network portion 114*a* between a horizontal input/output block 116*a* and a BLI 602 that do not vertically align. Further, for example, a signal can be transmitted vertically in the vertical native transmission network portion 114*b* between a vertical input/output block 116*b* and a programmable interconnect element that do not horizontally align. Similarly, signals can be transmitted from any input/output block 116 to a hard block circuit 112 that do not align via a respective native transmission network portion 114*a*, 114*b*, 114*c*, 114*d*.

Signals can be routed between, e.g., any of the hard block circuit 112, the programmable logic region 110, the processing system 104 and/or GPU/RPU 902, 904 via the protocol routing network 106. Once a signal enters the protocol routing network 106 in any protocol routing network portion 106*a*, 106*b*, 106*c*, 106*d*, the signal can be routed in any direction along any of the protocol routing network portions 106*a*, 106*b*, 106*c*, 106*d*. As an example, a signal can enter the vertical protocol routing network portion 106*d* from a vertical hard block circuit 112*d* and be routed via protocol routing network portions 106*d* and 106*a* to a BLI 602 at a bottom boundary of the programmable logic region 110. As another example, in FIG. 11, a signal can enter the horizontal protocol routing network portion 106*a* from the processing system 104 and be routed via protocol routing network portions 106*a* and 106*b* to a vertical hard block circuit 112*b*. Various other routing may be implemented through the protocol routing network portions 106*a*, 106*b*, 106*c*, 106*d*.

In some examples, the native transmission network 114 can have a much longer worst case scenario than routing in an interconnect network of the programmable logic region 110. In some examples, the native transmission network 114 can be more efficient for connections from input/output blocks 116 to hard block circuits 112 than connections that may use routing in an interconnect network of the programmable logic region 110. Using the native transmission network 114 (e.g., instead of routing in the programmable logic region) can maintain flexibility and can result in increased reach of transmitting signals.

In some examples, any input/output block 116 can be located along any edge of a layout of an IC. More particularly, any XPIO, MGT, ADC, DAC, HBM interface, register, flip-flop, and/or any other general or specialized input/output block can be disposed in any region of the horizontal input/output blocks 116*a*, 116*c* and vertical input/output blocks 116*b*, 116*d* of any of the layouts of FIGS. 6 and 8 through 11.

Although FIGS. 8 through 11 illustrate a native transmission network portion 114*a-d* along each side of the respective layout 800, 900, 1000, 1100, a native transmission network portion may not be along one or more sides of a layout of an IC in other examples. For example, native transmission network portions may be along one, two, or three sides of a layout of an IC. More specifically, when the programmable logic region 110 is a columnar architecture, a layout can include a native transmission network portion (e.g., vertical native transmission network portions 114*b*, 114*d*) on left and right sides of the programmable logic region 110 without a native transmission network portion along a top edge and a native transmission network portion along a bottom edge of the layout.

Any one or more of the layers of boundary interconnect can be omitted along any one or more sides of a layout of an IC in some examples. For example, referring to FIG. 8, vertical protocol routing network portion 106*b* and vertical native transmission network portion 114*d* may be omitted together. Other portions and combinations of portions of the native transmission network 114, protocol routing network 106, and BLIs 602 may be omitted. Additionally, in some examples, a programmable logic region 110 (with an interconnect network) can replace any portion of the native transmission network 114, protocol routing network 106, and hard block circuits 112.

Figure 12:
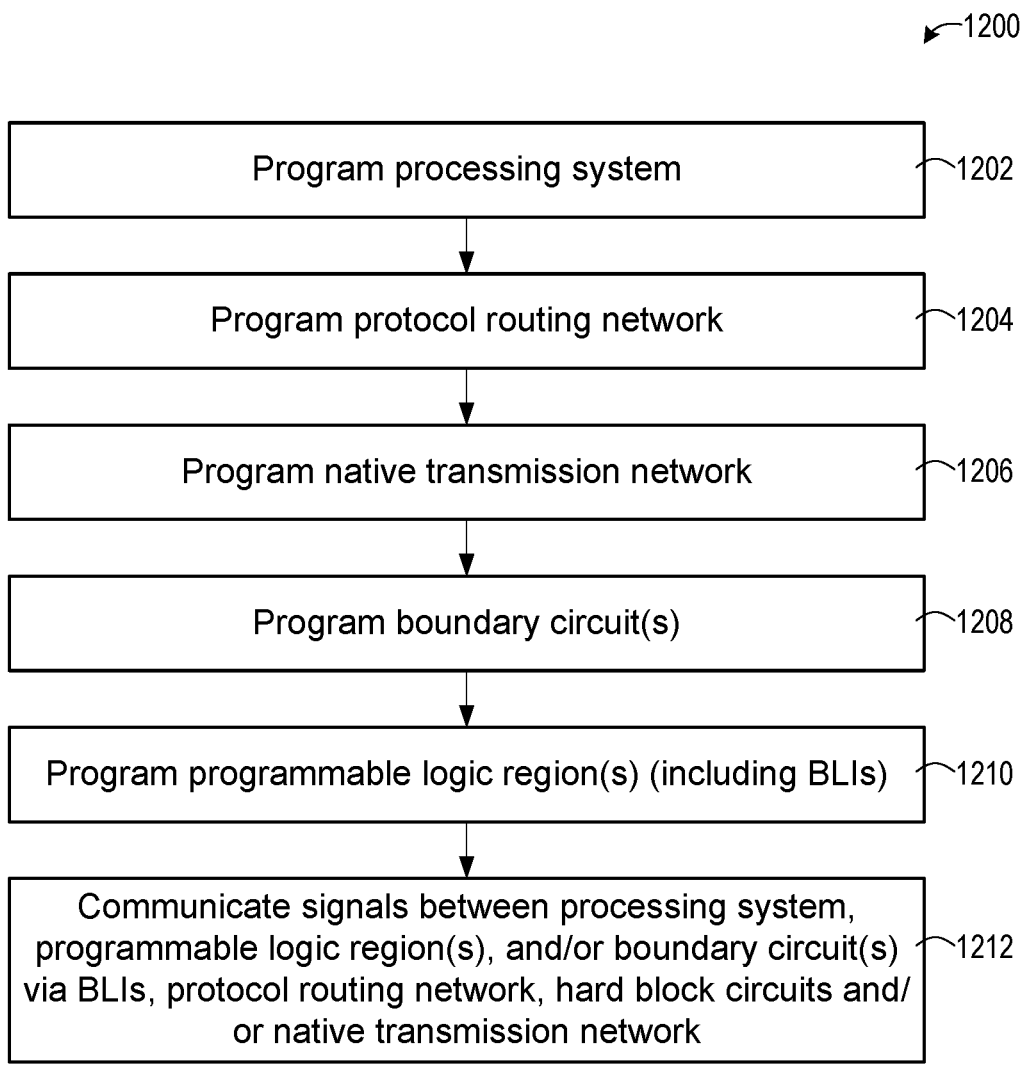
FIG. 12 is a flowchart of a method for operating an IC according to some examples.

FIG. 12 is a flow chart of a method 1200 for operating an IC according to some examples. The IC can be or include the SoC 102 of FIG. 1, which can have any of the layouts of FIGS. 6 and 8 through 11, for example. The IC includes a layered boundary interconnect. The IC, in the described example, includes a layered boundary interconnect including a native transmission network, a protocol routing network, and BLIs in programmable logic region(s).

At block 1202, a processing system is programmed. For example, program code instructions can be loaded in memory of the processing system for the processing system (e.g., a PMC) to execute to control operations of the IC.

At block 1204, a protocol routing network is programmed. For example, when the protocol routing network is a programmable communication network of a NoC, the protocol routing network can be programmed using an NPI of the NoC as described previously.

At block 1206, a native transmission network is programmed. The native transmission network is programmed, in some examples, via a configuration interconnect implemented to program programmable logic regions in a subsequent operation. In other examples, the native transmission network is programmed via an NPI of a NoC, when a NoC is implemented, which can also program the protocol routing network of the NoC in block 1204. In some examples, some components of the native transmission network can be programmed by the NPI while other components of the native transmission network can be programmed by the configuration interconnect.

At block 1208, optionally, boundary circuit(s) are programmed. Boundary circuits can be or include any of the input/output blocks 116 and/or hard block circuits 112. For example, when boundary circuits are programmable, the boundary circuits can be programmed by memory mapped write requests via an NPI of a NoC when a NoC is implemented in the IC as described above. Programming hard block circuits can enable or disable a bypass mode as described previously. Programming the boundary circuits can permit the boundary circuits to accommodate a logic function, application, and/or kernel instantiated in the programmable logic region(s).

At block 1210, programmable logic region(s) are programmed. The programmable logic region(s) (e.g., including BLIs) can be programmed by transmitting configuration data from the processing system (e.g., the PMC) via a configuration interconnect (e.g., a frame-based configuration interconnect). Programming the programmable logic region(s) can instantiate any logic function, application, and/or kernel in the programmable logic region(s).

At block 1212, signals are communicated between the processing system, programmable logic region(s), and/or the boundary circuit(s) via the BLIs, the protocol routing network, hard block circuits, and/or the native transmission network. The communication of the signal is based on the configuration of the various components (e.g., BLI, the protocol routing network, hard block circuit, and/or native transmission network).

The following examples illustrate communications between a programmable logic region (e.g., a routing network including the programmable interconnect elements) and an MGT.

(1) Via a BLI, the protocol routing network, a hard block circuit with the bypass mode disabled, and the native transmission network, such as when the MGT is along a horizontal edge of a layout of the IC.

(2) Via the protocol routing network, a hard block circuit with the bypass mode disabled, and the native transmission network, such as when the MGT is along a vertical edge of a layout of the IC.

(3) Via a BLI, a hard block circuit with the bypass mode (bypassing the protocol routing network) enabled, and the native transmission network, such as when the MGT is along a horizontal edge of a layout of the IC.

(4) Via a hard block circuit with the bypass mode (bypassing the protocol routing network) enabled and the native transmission network, such as when the MGT is along a vertical edge of a layout of the IC.

In some instances, the communication is between a programmable logic region and an HBM interface, for example. The following examples illustrate communications between a programmable logic region (e.g., to a routing network including the programmable interconnect elements) and an HBM interface.

(1) Via a BLI, the protocol routing network, a memory controller, and the native transmission network, such as when the HBM interface is along a horizontal edge of a layout of the IC.

(2) Via the protocol routing network, a memory controller, and the native transmission network, such as when the HBM interface is along a vertical edge of a layout of the IC.

(3) Via a BLI, a memory controller with the bypass mode (bypassing the protocol routing network) enabled, and the native transmission network, such as when the HBM interface is along a horizontal edge of a layout of the IC.

(4) Via a memory controller with the bypass mode (bypassing the protocol routing network) enabled and the native transmission network, such as when the HBM interface is along a vertical edge of a layout of the IC.

The memory controller is an example of the hard block circuits, and the MGT and HBM interface are examples of input/output blocks. Other circuits may be implemented for the hard block circuits and input/output blocks according to other examples.

In some examples, operating the IC attempts to bring input/output block to be powered and stable as quickly as possible. This can include programming the protocol routing network and native transmission network in any order after the processing system is programmed. Then, the boundary circuit(s) (including any input/output blocks) are programmed, and any input/output blocks are stable before programming the programmable logic regions. In such examples, the programmable logic regions may be a lower priority to program or configure. In other examples, other orders of operations may be performed to obtain various target specifications.

While the foregoing is directed to specific examples, other and further examples may be devised without departing from the basic scope thereof, and the scope thereof is determined by the claims that follow.

What is claimed is:

1. An integrated circuit (IC) comprising:
a programmable logic region;
a plurality of input/output circuits;
a plurality of hard block circuits; and
a programmable native transmission network connected to and between the plurality of input/output circuits and the plurality of hard block circuits, the plurality of hard block circuits being connected to and between the programmable native transmission network and the programmable logic region, the programmable native transmission network comprising interconnected selection logic with associated memory elements, each memory element of the memory elements being programmable to configure the respective selection logic to implement one or more physical channels through the respective selection logic in the programmable native transmission network for communicating a respective signal.

2. The IC of claim 1, wherein the plurality of input/output circuits includes one or more eXtreme Performance Input/Outputs (XPIOs), one or more multi-gigabit transceivers (MGTs), one or more analog-to-digital converters (ADCs), one or more digital-to-analog converters (DACs), one or more high bandwidth memory (HBM) interfaces, one or more registers, one or more flip-flops, or a combination thereof.

3. The IC of claim 1, wherein the plurality of hard block circuits includes one or more memory controllers, one or more peripheral component interconnect express (PCIe) blocks, one or more Ethernet cores, one or more forward error correction blocks, an array of digital processing engines (DPEs), one or more processor cores, or a combination thereof.

4. The IC of claim 1, wherein the programmable native transmission network is programmable to selectively communicate a signal between an input/output circuit of the plurality of input/output circuits and a hard block circuit of the plurality of hard block circuits.

5. The IC of claim 1, wherein each of at least some of the plurality of hard block circuits is programmable to selectively communicate a signal between the programmable native transmission network and the programmable logic region bypassing processing of the respective hard block circuit.

6. The IC of claim 1 further comprising a protocol routing network connected to and between the plurality of hard block circuits and the programmable logic region.

7. The IC of claim 6, wherein each of at least some of the plurality of hard block circuits is programmable to selectively communicate a signal between the programmable native transmission network and the protocol routing network.

8. The IC of claim 1, wherein:
the programmable logic region includes columns of programmable interconnect elements;
the programmable logic region includes, at each end of each column of the columns of programmable interconnect elements, a boundary logic interface (BLI) connected to the respective column; and
at least some of the plurality of hard block circuits are connected to at least some of the BLIs of the programmable logic region.

9. The IC of claim 1 comprising a corner area, the corner area being a shadow of an orthogonal boundary element, at least some of the plurality of input/output circuits being disposed in the corner area.

10. A method for operating an integrated circuit (IC), the method comprising:
programming a protocol routing network of the IC, the protocol routing network being connected to and between hard block circuits of the IC and a programmable logic region of the IC, the hard block circuits being connected to the programmable logic region; and
programming a native transmission network of the IC, the native transmission network being connected to and between input/output circuits of the IC and the hard block circuits, programming the native transmission network comprising programming memory elements associated with selection logic of the native transmission network, the selection logic being interconnected in the native transmission network, wherein programming the memory elements configures the respective selection logic to implement one or more physical channels through the respective selection logic in the native transmission network for communicating a respective signal; and
programming the programmable logic region.

11. The method of claim 10 further comprising programming at least some of the hard block circuits to communicate a signal between the native transmission network and the programmable logic region to bypass processing of the respective hard block circuit.

12. The method of claim 10 further comprising communicating one or more signals between at least one of the input/output circuits and at least one of the hard block circuits, wherein communicating the one or more signals is via a respective one or more physical channels in the native transmission network based on a configuration of the native transmission network.

13. The method of claim 10, wherein:
the programmable logic region includes boundary logic interfaces (BLIs) at respective ends of columns of programmable interconnect elements;
a first subset of the BLIs is connected to the protocol routing network; and
a second subset of the BLIs is connected to the hard block circuits.

14. The method of claim 10, wherein:
programming the programmable logic region is performed via a frame-based configuration interconnect; and
programming at least some of the native transmission network is performed via the frame-based configuration interconnect.

15. The method of claim 10, wherein:
programming the protocol routing network is performed via a peripheral interconnect configured to transmit memory mapped write requests; and
programming at least some of the native transmission network is performed via the peripheral interconnect.

16. An integrated circuit (IC) comprising:
a layout area having edges;
a programmable logic region disposed within the layout area;
boundary circuits disposed within the layout area and along the edges, the boundary circuits including input/output circuits, the input/output circuits being disposed in a shadow of another one or more of the boundary circuits orthogonal to the input/output circuits; and
a programmable native transmission network connected to the input/output circuits and connected between the input/output circuits and the programmable logic region.

17. The IC of claim 16 further comprising:
hard block circuits disposed within the layout area and connected to and between the programmable native transmission network and the programmable logic region; and
a protocol routing network disposed within the layout area and connected to and between the hard block circuits and the programmable logic region.

18. The IC of claim 17, wherein each of at least some of the hard block circuits is programmable to selectively communicate a signal between the programmable native transmission network and the programmable logic region or the protocol routing network.

19. The IC of claim 17, wherein:
the programmable logic region includes a boundary logic interface (BLI) at a respective end of each column of a plurality of columns of programmable interconnect elements;
at least some of the hard block circuits are connected to a first subset of the BLIs; and
the protocol routing network is connected to a second subset of the BLIs.

20. The IC of claim 17, wherein:
the programmable logic region includes an interconnect network comprising columns of programmable interconnect elements; and
at least some of the hard block circuits and the protocol routing network are each connected to the interconnect network.

* * * * *